June 3, 1958 B. G. LEWIS 2,837,701
ELECTRONIC CONTROL CIRCUIT
Filed June 9, 1953
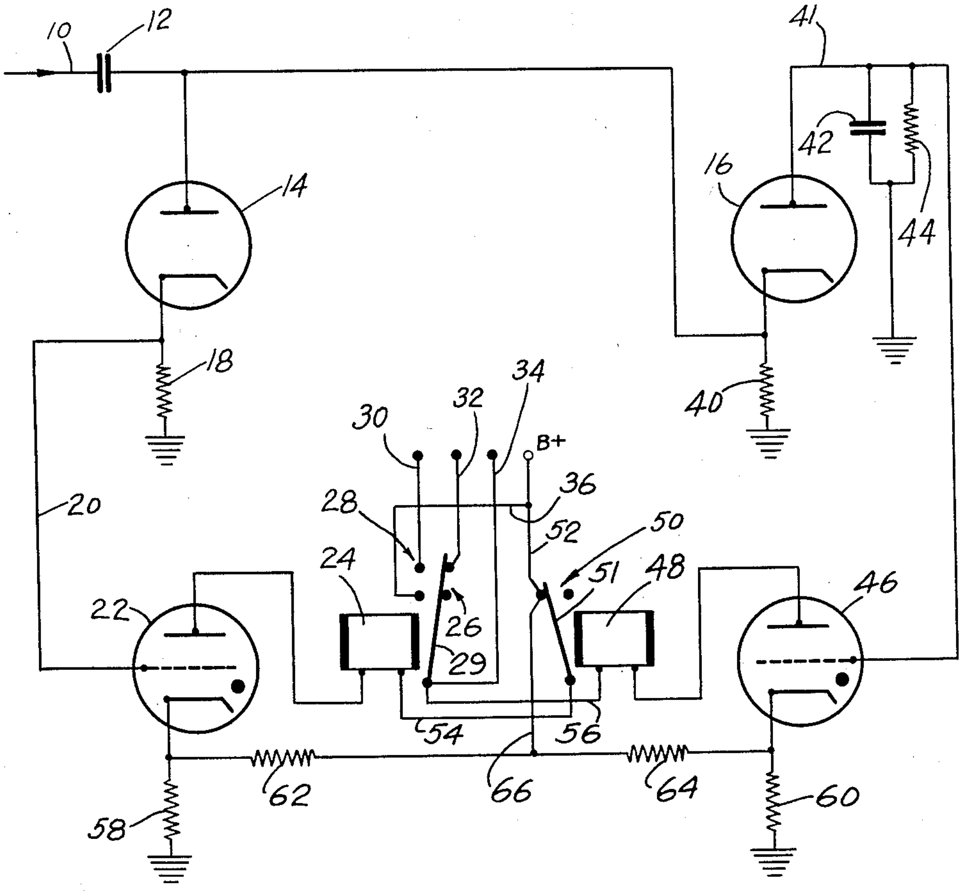
INVENTOR.
Benjamin G. Lewis
BY D. C. Snyder
A. R. McCrady
ATTORNEYS.

United States Patent Office 2,837,701

Patented June 3, 1958

2,837,701

ELECTRONIC CONTROL CIRCUIT

Benjamin G. Lewis, Los Angeles, Calif.

Application June 9, 1953, Serial No. 360,619

8 Claims. (Cl. 317—142)

(Granted under Title 35, U. S. Code (1952), sec. 266)

The invention described herein may be manufactured and used by or for the Government of the United States of America for governmental purposes without the payment of any royalties thereon or therefor.

This invention relates to an electronic control circuit wherein an input signal causes relay contacts to close or open, the relay contacts remaining in this position until a predetermined time after the input signal ceases to arrive.

In control circuits, it is often desirable that electrical or electromagnetic devices be started or stopped immediately upon the receipt of any desired signal input and to keep the electrical or electromagnetic devices functioning at precisely the same rate of operation despite fluctuations or pulsations in the signal current which do not exceed a certain time constant. Such a control may, for example, regulate machines which receive input data from sources which do not provide signals of constant amplitude, such as signals derived in the measurement of physiological characteristics. In the instant invention the control circuit comprises known elements such as diodes, relays, gas thyratrons, resistors, and capacitors so interconnected as to close a relay upon receipt of a signal through a diode. This diode then exerts control over a thyratron; a second thyratron actuated by a second diode controls the duration of firing or conduction of the first thyratron. The action of the first thyratron may be made to control various relays to perform useful functions in a manner hereinafter described.

An object of this invention is to provide means for closing or opening a relay or relays upon the receipt of any desired input signal and further to keep this relay reliably and consistently closed or open, despite any fluctuations in the input signal, until a definite time has elapsed after the input signal has ceased to be received, at which time the relay will open or close, not to be activated again until a signal input is again applied to the circuit.

Another object of this invention is to provide a control circuit that enables very small energies to reliably control large amounts of power passing through the control relay in such a manner that the flow of power will persist only while the control voltage is present at the input to the control circuit, and for any definite time after its removal.

A further object of this invention is to provide a control circuit that will reliably stop or start any electrical or electromagnetic device immediately upon the receipt of any desired form of energy and keep the electrical or electromagnetic device functioning at precisely the same rate or mode of operation despite fluctuations, pulsings, or complete removal of the input signal, provided its absence does not exceed a time constant set at the control circuit.

Other objects and many of the attendant advantages of this invention will be readily appreciated as the same becomes better understood by reference to the following description.

The single figure of the drawing illustrates a schematic diagram of a preferred embodiment of the invention.

In the single figure, the signal input is applied to the control circuit through lead 10 and capacitor 12 to the plate of diode 14 and to the cathode of diode 16. Diode 14 is provided with resistor 18 to ground. The output of diode 14 is taken across resistor 18 through lead 20 to the control grid of gas thyratron 22. The output from the plate of thyratron 22 passes through the solenoid winding of relay 24 which is provided with a first pair of contacts 26 and a second pair of contacts 28. The actual control function of switching performed by the circuit is handled by the relay contacts 28 acting in conjunction with relay armature 29. The contacts may be connected to external circuitry through leads 30 and 32 connected directly to the contacts and through lead 34 which is connected to the relay arm. A source of B-plus voltage (not shown) is connected through lead 36 to the contact point of the contact pair 28 which is contacted by armature 29 as solenoid winding 24 is energized. Diode 16 has its cathode connected to ground through resistor 40. The output of diode 16 passes through plate lead 41 to the control grid of thyratron 46. Between diode 16 and thyratron 46 a capacitor 42 connects lead 41 to ground, and resistor 44 shunts this capacitor. The plate circuit of thyratron 46 contains the solenoid or coil windings 48 having an associated pair of contacts 50, which are contacted by relay armature 51. To one side of this pair of contacts is connected lead 52 which goes directly to the source of B-plus voltage. Relay armature 51 which is attracted by solenoid winding 48 when energized, is connected through lead 54 and through solenoid winding 24 to the plate of thyratron 22. One terminal of the solenoid winding of relay 48 is connected to the plate of thyratron 46; the other terminal, through lead 56, is connected to armature 29 which is actuated by solenoid winding 24. The cathodes of thyratrons 22 and 46 are connected to ground through resistors 58 and 60 respectively. The cathodes of the two thyratrons are also connected to each other through resistors 62 and 64; at the junction point of these resistors lead 66 provides a connection to the B-plus voltage. Diodes 14 and 16 may be located in separate envelopes or in the same envelope; a standard type 6H6 or 6AL5 double diode is suitable. Thyratrons 22 and 46 may be of the triode type as shown, or of the tetrode type. It has been found that the tetrode type is more sensitive to small variations in control potentials and may be desirable for certain applications. A small 2B21 type thyratron tube can be utilized to close a relay of considerable size. Type 3B22 thyratrons may be utilized if desired to control heavy equipment. Capacitor 12 should be selected to be relatively large compared with the size of capacitor 42 to avoid a capacitor voltage divider effect, and anti-arcing condensers may be necessary across the various relay contacts depending upon the nature of the external circuits to be controlled. The power voltage and current supply must be selected to fit the particular thyratrons and diodes used. Although cathode heater provisions are not shown, their presence will be understood.

In the operation of the device, an A. C. potential is applied to the input of the circuit over lead 10. This potential is to be applied as the controlling voltage and its origin is not the subject of this invention. Upon receipt of the controlling voltage by diode 14 a rectified positive potential appears at the cathode due to the method of connection of the diode. This positive potential causes gas thyratron 22 to change from a non-conducting state to a conducting state. The plate current through thyratron 22 energizes coil windings 24 thus attracting armature 29 which in turn causes the external control circuits to be opened or closed depending upon the mode of connection. If the external circuit is connected to leads 30 and 34, the closing of the relay will close the external circuit. If, on the other hand, the external circuit is connected to lead 34 and lead 32, closing the relay will open the external circuit because the armatures of relay windings 24 and 48 are positioned away from the solenoid windings when the windings are not energized. As relay winding 24 is energized a circuit is also closed which connects solenoid winding 48 to the B-plus voltage thereby readying thyratron 46 for firing. However, tube 46 is restrained from firing by the negative signal on the grid. This signal is derived from diode 16 and will be of a negative polarity since diode 16 is connected to the reverse of diode 14 with respect to the input signal. As long as this negative signal is present, thyratron 46 will be cut off, and thyratron 22 will continue to conduct because the grid loses control until the plate current is reduced to zero due to the nature of a gas thyratron. As long as a steady A. C. potential is applied to the input, thyratron 46 will be cut off due to the negative value at which the grid is maintained. However, if the signal is erratic or is broken up or varies in strength, thyratron 46 will still not fire immediately upon cessation of the signal. This is true because the negative output of diode 16 is impressed across capacitor 42, which, when diode 16 ceases to produce a negative output signal, will still drive the grid of thyratron 46 sufficiently to maintain thyratron 46 at cutoff. The length of time over which thyratron 46 will be cut off after termination of signal input over lead 10 is determined by the time constant of the delay circuit comprising capacitor 42 and resistor 44, which discharges the capacitor slowly. This offers a method of regulating the length of time that the control circuit remains in the condition determined by the initial firing of thyratron 22 since the values of capacitor 42 and resistance 44 may be set for any determined time interval or the value of resistor 44 may conveniently be varied to vary the time constant by substituting therefor a variable rheostat. Assuming that the signal has ceased and the time constant of the delay circuit has been exceeded, the grid of thyratron 46 will no longer be negative because of the input signal from diode 16 and thyratron 46 will then fire. As thyratron 46 starts to conduct, relay winding 48 will be energized thereby opening the circuit by which the B-plus voltage is connected through relay winding 24 to the plate of thyratron 22. Hence, thyratron 22, being deprived of plate voltage, will cease conducting and the position of armature 29 contacting the associated relay contacts will change and effect a change in the control exerted on the external control circuits which depends upon the position of the relay arm with respect to contact pair 28. As thyratron 22 ceases to conduct and relay winding 24 is de-energized, this in turn opens the circuit which connects the B-plus voltage through relay windings 48 to the plate of thyratron 46. Hence, thyratron 46 will also cease to conduct, and, when it ceases to conduct relay windings 48 will no longer be energized. Thus a condition is reached in which neither thyratron is firing and neither relay winding is energized and no current is passing through either of the diodes. The circuit is now ready for the reception of a new signal, at which time the above described circuit of operation will be repeated. Thus the presence of a relatively small alternating potential on the input lead 10 will cause a relay, which can be of considerable size, to control an external circuit, this action being maintained for as long as the input signal is present and for any definite period desired after the potential on the input lead is removed. The purpose of resistors 62 and 64 which are connected between the B-plus voltage source and the cathodes of thyratrons 22 and 46 respectively is to provide a positive bias which, applied to the cathodes of the thyratrons, is equivalent to a negative voltage applied to the grids, thus preventing the thyratron 22 from firing until an input signal of the proper amplitude is received, and in conjunction with the negative bias developed in diode 16, as previously described, prevents thyratron 46 from firing until the respective input signal ceases.

It is apparent that the values selected for the various electrical components of the circuit may be varied in accordance with conventional design considerations. The following exemplary set of values are given as one example of an operative circuit according to the invention. Tubes 14 and 16 may each be one-half of a 6AL5 tube, and tubes 22 and 46 are each a 2D21 gas tube with the shield grid connected to the cathode. Capacitor 12 has a value of 0.1 microfarad and capacitor 42 has a value of 0.5 microfarad. Registor 44 has a value of one megohm whereby the time-constant of the delay circuit comprising capacitor 42 and resistor 44 will keep the circuit closed about one-half second after the input voltage is removed. Resistors 18 and 40 each have a value of one megohm; resistor 58 has a value of 1100 ohms, and resistor 62 has a value of 12,000 ohms. Relays 24 and 48 each have 1000 ohms resistance and close at a current of approximately ten milliamperes. The B+ voltage is 250 volts. Resistor 64 has a value of 15,000 ohms, and resistor 60 has a value of ten ohms, thereby giving a small positive bias of approximately one-sixth of a volt on the cathode of tube 46. It should be understood that resistors 64 and 60 may be eliminated and the connection of the cathode of tube 46 to the B+ source may also be eliminated whereby effectively the resistance of resistor 64 is made infinite and the resistance of resistor 60 is made zero. The elimination of resistors 64 and 60 as proposed above will not in any way effect the basic functioning of the circuit.

Obviously many modifications and variations of the present invention are possible in the light of the above teachings. It is therefore to be understood that within the scope of the appended claims the invention may be practiced otherwise than as specifically described.

What is claimed is:

1. Apparatus for conditioning an electrical network upon receipt of an input signal, which periodically varies in polarity and which is subject to fluctuations in amplitude, and for maintaining the conditioned status of such network for a predetermined period of time following the cessation of the input signal, said apparatus comprising: a first thyratron; a circuit for applying operating potentials to said first thyratron; means for biasing said first thyratron beyond cutoff in the absence of a control potential applied thereto; means for deriving a first control potential from the excursions of said input signal in one direction of polarity and for applying such first control potential to said first thyratron to render the latter conductive; a first relay having a first pair of switch contacts which are closed when the relay is de-energized and a second pair of switch contacts which are closed when said relay is energized, said two sets of switch contacts being adapted for incorporation into an external utilization circuit; means for connecting said first relay to the output of said first thyratron so that the relay is energized when the thyratron becomes conductive to thereby establish a circuit status for said two sets of switch contacts; a second normally non-conductive thyratron; a circuit for supplying operating potentials to said second thyratron; a second relay having a pair of switch contacts which are closed when said second relay is de-energized and opened when said second relay is energized, said switch contacts being included in the circuit for supplying operating potentials to said first thyratron; means, including a resistance-capacitance network, for deriving a second control potential from the excursions of said input signal in the remaining direction of polarity and for applying such second control potential to said second thyratron to maintain the latter nonconductive for a period of time, following the cessation of said input signal, which is predetermined in accordance with the time-constant of said resistance-capacitance network, after which period of time said second thyratron will become conductive to energize said second relay and open the switch contacts associated therewith, thereby disconnecting said first thyratron from its source of operating potentials and rendering it nonconductive; and means responsive to the deenergization of said first relay when conduction of said first thyratron is terminated to disconnect said second thyratron from its source of operating potentials and hence render it nonconductive.

2. Apparatus according to claim 1, in which said input signal is subject to variations which may extend to zero amplitude for periods of time which are relatively short in comparison with the over-all time-duration of the applied input signal, the time constant of the said resistance-capacitance network being chosen so that the amplitude of the said second control potential applied to the second thyratron is of sufficient value to maintain such second thyratron nonconductive during the variations in amplitude to which said input signal is subject and for the said predetermined period of time following the cessation of such signal.

3. Control apparatus for utilizing an input signal which alternates in polarity and which is subject to fluctuations in amplitude, said apparatus comprising a pair of normally nonconductive gas-filled electron discharge devices, means responsive to the reception of an input signal to render one discharge device conductive and to condition the second for subsequent conduction, delay means effective a predetermined period of time following cessation of the received input signal to permit conduction of said previously-conditioned second discharge device and to de-energize the first as a function of such conduction, and means for deenergizing said second discharge device when the first becomes nonconductive.

4. Control apparatus according to claim 3, in which said delay means includes a time constant circuit the period of which is chosen to exceed the duration of any fluctuations in amplitude to which such input signal may be subject.

5. Apparatus according to claim 4, in which said time constant circuit comprises a resistance-capacitance network, and in which said delay means includes a circuit for rectifying said input signal and for applying such rectified signal to said resistance-capacitance network thereby to develop a control potential of negative polarity for application as a bias to said second electron discharge device.

6. Control apparatus for utilizing an input signal of alternating polarity which is subject to amplitude fluctuations which are short with respect to the duration of said signal, comprising a pair of normally nonconductive thyratrons; means responsive to the reception of an input signal to render one thyratron conductive and to condition the remaining thyratron for conduction, said means also including a circuit for developing a bias voltage which maintains said remaining thyratron nonconductive regardless of fluctuations in amplitude of the said input signal and for a predetermined period of time following cessation of the latter, after which period of time said remaining thyratron becomes conductive; means responsive to conduction of said remaining thyratron to render said one thyratron nonconductive; and means responsive to deenergization of said one thyratron to deenergize said remaining thyratron.

7. Control apparatus according to claim 6, in which the first-mentioned means includes a first relay the circuit status of which depends upon the state of conduction of said one thyratron, and in which said means responsive to conduction of said remaining thyratron includes a second relay the circuit status of which depends upon the state of conduction of such remaining thyratron.

8. Control apparatus according to claim 7, in which application of operating potentials to said remaining thyratron is dependent upon the circuit status of said first relay, and in which application of operating potentials to said one thyratron is dependent upon the circuit status of said second relay.

No references cited.